Patented June 15, 1937

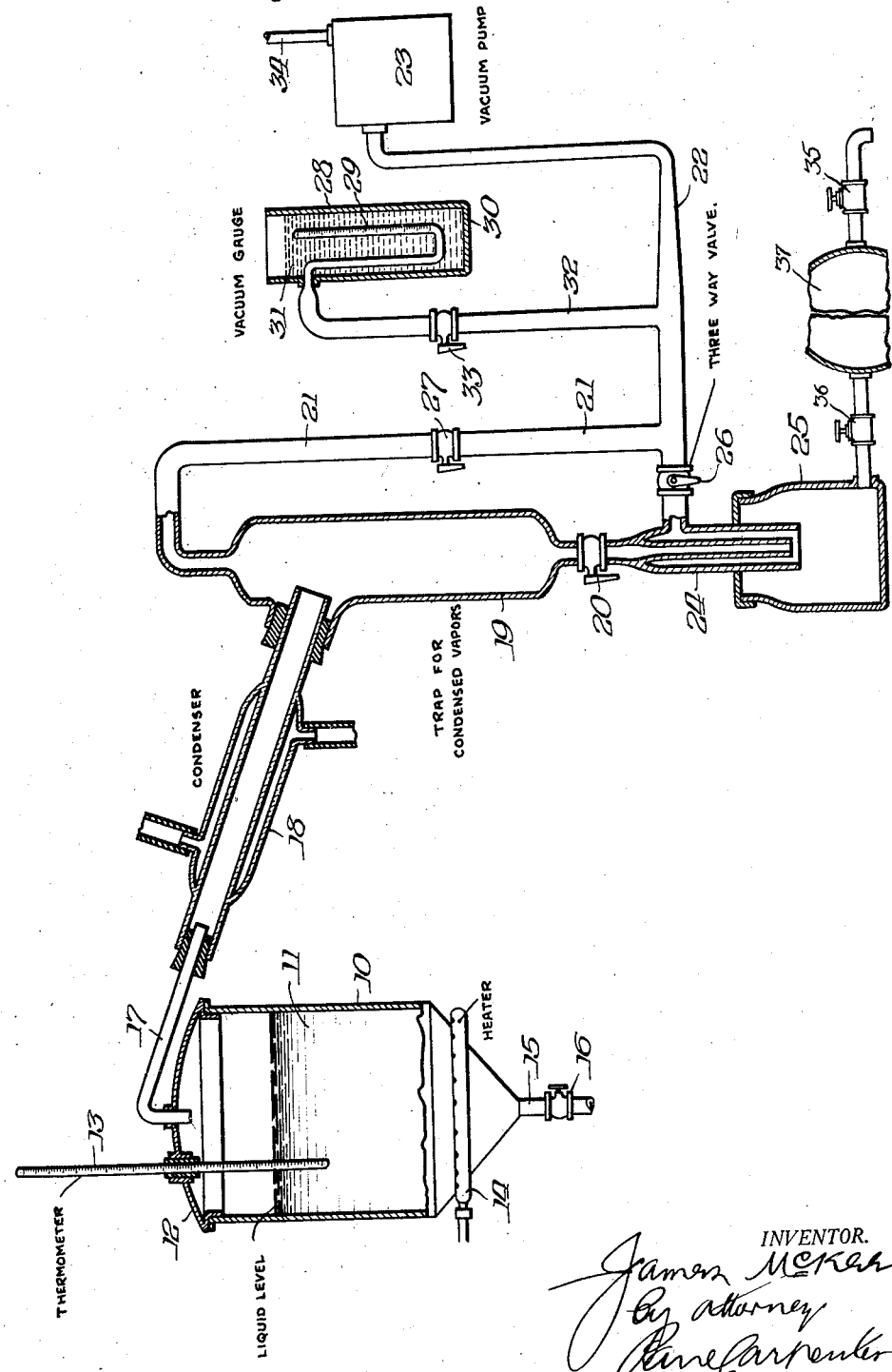

2,083,572

UNITED STATES PATENT OFFICE 2,083,572

PROCESS OF TREATING OIL

James McKee, Media, Pa.; Susan M. McKee administratrix of James McKee, deceased

Application April 25, 1928, Serial No. 272,645
Renewed September 12, 1935

9 Claims. (Cl. 87—12)

This invention relates to the modification of oils and fats, for the purposes among others of producing in one aspect improved lubricants and in another of producing edible and/or medicinal oils and to a process of treating the same, useful in preparing an edible and/or medicinal product; more particularly my invention relates to the production of an edible or medicinal compound having a readily assimilable oxygen component, such as ozone in a vehicle therefor in high concentrations, and a novel process for conditioning oils to augment their power to retain readily assimilable oxygen, such as ozone, particularly in high concentrations. Still more particularly, my invention relates to a new edible or medicinal compound having a higher concentration of readily assimilable oxygen, such as ozone, than has heretofore been produced.

Where I have attempted to combine readily assimilable oxygen, such as ozone, with a vehicle therefor, using oils as the vehicle, involving the passage of the readily assimilable oxygen, as ozone, through the oily medium, I found that the ozone is very fugitive and can not be retained by the oil except in quantities of such low concentrations as to be ineffective as a medicinal compound. Furthermore, I have found that ordinary oils, such as cod liver oil, salmon oil, sardine oil, and other fish oils, rape seed oil, corn oil, cottonseed oil, linseed oil, castor oil, olive oil and other vegetable oils, lard oil, neatsfoot oil, tallow oil, and other animal oils, and certain mineral oils, such as paraffin or asphalt distillates, have negligible powers to retain readily assimilable oxygen, such as ozone.

I have found that I may vary oils in general, and particularly vegetable oils, such as rape seed, cottonseed, linseed, corn, castor and olive oils, or animal oils, such as lard oil, neatsfoot oil, and tallow oil, fish oils such as cod liver, salmon, sardine, whale and sperm and certain composite mineral oils, to retain a high concentration of assimilable oxygen, such as ozone, by a conditioning process which not only renders the oils more palatable when used as a medicinal preparation to be taken internally but increases the ability to absorb and retain throughout prolonged periods of storage a higher concentration of the readily assimilable oxygen, such as ozone, than any obtainable heretofore.

My invention therefore has for an object thereof the provision of a process for augmenting the properties of oils to retain assimilable oxygen, such as ozone; the provision of a process for treating oils involving the separation of odor and taste components from vegetable, animal or mineral oils by a vacuum separation including heat to change the internal structure of the oils and to incorporate the readily assimilable oxygen under these conditions whereby a more desirable vehicle is obtained, retaining therein a high concentration of readily assimilable oxygen, such as ozone, than heretofore obtainable; the provision of a process for treating fish, animal, vegetable or mineral oils to increase their powers to retain a high percentage of assimilable oxygen, such as ozone, by increasing the specific gravity of the oil, and also increase its normal viscosity, involving a heat treatment under vacuum.

My invention still further has for an object thereof the provision of a new vehicle for retaining readily assimilable oxygen in concentrations higher than heretofore obtainable.

My process may be practiced in connection with a large number of oils. Oils such as animal oils, including lard, neatsfoot and tallow oils, and fish oil, such as cod liver oil, salmon oil, and sardine oil; vegetable oils, such as rape seed, corn, cottonseed, linseed, castor and olive oils and mineral oils for example such as compositions of petroleum derivative and cod-liver oil, all having a specific gravity below .970 and relatively low viscosities, may be modified to produce an edible or medicinal compound to retain readily assimilable oxygen, such as ozone, in amounts of up to about 15% by increasing the specific gravity and viscosity, after first separating the odor and taste components of the oils and then injecting ozone to the point where the desired amount of ozone (which preferably ranges from 2% for certain purposes up to about 15% for others) is retained in the oily vehicle.

The process involves heating the oil to the flash point, preferably in vacuo to separate therefrom odor and taste components and raise the specific gravity and viscosity until a specific gravity of about .975 (plus or minus .005) is reached and then incorporating therewith the readily assimilable oxygen, such as ozone, by an ozonizing process in which the oil is maintained at 150° F. and ozone itself, or in a vehicle, is passed through the oil. The oil under consideration, whether animal, fish, vegetable or mineral, is preferably heated in a chamber without access of air and in the case of fish oil, for example, at a temperature of about 560° F. A vacuum is retained at about 10 to 15 millimeters.

The preliminary heating under these conditions will drive off the odoriferous and taste components, the process being preferably continued for a period from about thirty minutes to about two hours or until samples of the oil indicate that the specific gravity of the oil has been increased to about .975.

The oil maintained at a temperature of about 150° F., under aforesaid conditions, is ozonated, preferably by passing ozone or air having a certain percentage of ozone incorporated therein. The ozone may be obtained by passing an electric spark of high tension through air and drawing air over the spark gap so that the air carries the ozone. This mixture is then conducted into the oil to bubble therethrough until a point is reached where a maximum concentration and absorption is indicated. The ozone may also be obtained by passing an electric spark through oxygen in a vehicle of an inert gas.

My process may be carried out in connection with the apparatus shown in the accompanying drawing diagrammatically illustrating the same. In the view, a tank 10 is partially filled with the oil 11, to be treated. This tank is provided with a sealing cover 12, serving to suitably suspend a thermometer 13, or similar heat indicating device. At the lower portion of the tank a suitable, ringed heater or the like is provided, surrounding the conical portion of the tank, at the bottom of which there is provided a suitable draw off pipe 15, with a valve 16. At the upper portion of the tank and above the liquid level, the vaporous material may be conducted off through the pipe 17, connected with a condenser 18. The vaporous material formed as a result of heating the tank passes out through the pipe 17 to the condenser 18, in vaporous form. Condensible material will be deposited within the trap 19, closed at the bottom by the pet cock 20. The top of the trap 19 is connected to the line 21, connected with the vacuum line 22, operated by the vacuum pump 23. The vacuum line 22 may alternatively connect with the trap for drawing off the vapors or with the bottom of the trap, at the drain mechanism 24, leading to the container 25. A three-way valve 26 is disposed between the draining device 24 and the vacuum line 22. The vacuum line 22 may, therefore, be alternatively connected with the draining mechanism or the pipe line 21 and for this purpose a pet cock 27 may be disposed between the vacuum line and the pipe line 21.

Along the line 22, to determine the pressure head a vacuum gauge 28 is interposed. This preferably comprises a monometer 29, retained within the chamber 30, in which is disposed a liquid 31, maintained at constant temperature. The monometer is connected with the vacuum line 22 by the line 32, between which and the gauge is interposed a pet cock 33.

In operation, the liquid 11, within the tank 10, is gradually brought to the temperature best suited for treating the oil and in the case of the treatment of animal oil, such as fish oil, the temperature is brought up to about 560° F. The vacuum pump is then put into operation and during the heating a vacuum is maintained of about 10 to 15 millimeters, which is the pressure I prefer in order to avoid drawing over too much of the fatty acid. The vapors drawn off through the pipe 17 first strike the condenser. These vapors comprise both odoriferous materials and taste components, some of which are condensible and will be changed to the liquid state by the condenser and deposited within the trap 19.

The odor and taste components which go off during the heating of the oil in vacuo are the acids which impart to the oils their respective characteristic odors and tastes, e. g., in fish oils, clupanodonic acid ($C_{18}H_{28}O_2$), in corn and cottonseed oil, linolic acid ($C_{18}H_{32}O_2$), in lard oil, oleic acid ($C_{18}H_{34}O_2$).

Others of the vapors will pass off through the line 21 and to the vacuum pump and out to the atmosphere through the outlet pipe 34. Condensible materials retained within the trap 19 may be drawn off and deposited into the container 25 by connecting the vacuum line with the condraining device 24 and also by opening the pet cocks 20 and 27. The reduced pressure within the container 25 will serve to draw off the material within the trap 19 without breaking the vacuum upon the heating apparatus.

To remove the material deposited in the vessel 25, the cock 36 is opened and the cock 35 is closed, whereupon the fluid within the vessel 25 will flow into the drum 37. If desired, upon closing the cock 36 and opening the cock 35, the contents of the drum may be sampled.

By the apparatus as shown, animal oils, such as fish oil, including cod liver oil, having a specific gravity of about .928 may be heated under reduced pressures at 560° F. for a period of about two hours to remove the taste and odor components, at the same time thickening the oil and increasing the specific gravity to about .975 plus or minus .005. The oil so treated is then ready for ozonating and this may be done in the same apparatus by maintaining the oil at a temperature of about 150° F. and conducting the ozone directly into the liquid while it is thus heated or, if so desired, this may be cooled down to lower temperatures for a lesser degree of ozonation, it being preferred, however, to retain a temperature to reduce the viscosity of the oil to facilitate the ready passage of the ozone or medium which acts as a vehicle for the ozone. Ozone may be incorporated and retained by the oil so treated in amounts up to about 15%.

In the case of vegetable oils, such as rape seed oil, corn oil, cottonseed oil, linseed oil and olive oil, having a specific gravity varying from .913 to .932, a similar treatment may be resorted to, the temperature being that of the flash point, viz: 560° F. and the time factor from thirty minutes to two hours.

The viscosity best suitable for ozonating these oils to the maximum is that which accompanies a rise in specific gravity to about .975, such viscosity reaching in my experience 2830 (Saybolt) at 100° F.

In the case of the treatment of a vegetable oil, such as some types of linseed oil, I may for best results modify the treatment. This oil, which has a normal specific gravity of .927–.932 is first oxidized by blowing in air at a temperature of 130° F. until it reaches a specific gravity of about .943. The oil so oxidized may then be heated in the same way as the vegetable oils previously discussed until the specific gravity has been raised to about .975. This oil may then be ozonated, when these conditions are obtained, in the manner above described.

In the case of preparing mineral oils to augment their properties to retain a high quantity of readily assimilable oxygen, such as ozone, I find it desirable to incorporate with the mineral oil a quantum of highly ozonated oil, such as cod-liver oil containing about 15% ozone, so as to give the desired ozone content.

Though the oils above described, thickened in accordance with the process outlined, may be ozonated to obtain a high concentration of the readily assimilable oxygen, such as ozone, it is preferred to first separate the odoriferous and taste components. Where these odoriferous and taste components are condensible and it is desired to give the final ozonated product some of the original characteristics, the condensible materials collected in the vessel 25 may be reincorporated after such suitable treatment as may be desired, into the treated oil and this is preferably done before ozonation of the oil.

Oils treated in accordance with my process have the property of retaining ozone in higher concentrations than heretofore obtainable and may retain ozone in quantities up to 15% as compared with mere traces of the same. Oils treated with ozone as described to retain a quantity of 15%, and over have their ozone content most effective for medicinal compositions, both internal and external, the ozone being very highly assimilable.

In my experience, I find that I am able to produce a substantially odorless and tasteless castor-oil, whose cathartic properties which have been removed may be restored without simultaneously restoring the objectionable properties, by subjecting the condensate in the tank 25 to the action of steam heated to about 350° F. until the taste and odor factors are removed, and then reincorporating the residual ricinoleic acid in the treated oil.

In my experience, I further find that rendered tallow (either beef or mutton) may be treated by the hereinabove disclosed process for increasing viscosity even omitting the establishment and maintenance of a vacuum, and the resultant highly viscous product may be employed in about half the usual quantity for increasing the viscosity of mineral oils in the production of cut grease and the like tallow thus treated, and also other oils hereinabove mentioned, may be so utilized without ozonation.

In the claims, where I have referred to oleaginous oils and fats, I mean to include thereby oils, such as cod liver oil, salmon oil, sardine oil, whale and sperm oil and other fish oils, rape seed oil, corn oil, cotton seed oil, linseed oil, castor oil and other vegetable oils, lard oil, neats foot oil, tallow oil and other animal oils.

Having thus described my invention and illustrated its use, what I claim as new and desire to secure by Letters Patent is:

1. The process of treating oleaginous oils and fats of a specific gravity of less than .970 by heating under diminished pressure without access of air to raise the specific gravity to about .975 and then passing ozone therethrough to ozonize the same.

2. The process of treating oleaginous oils and fats of a specific gravity of less than about .970 by heating without access of air to increase the specific gravity to about .970 to .980 and then ozonating the same.

3. The process of treating oleaginous oils and fats which include heating the same without access of air to substantially completely remove odoriferous and taste components and thicken the same to a specific gravity of about .970 to .980 and then passing ozone therethrough to absorb from .5 to 15% ozone.

4. The process of treating oleaginous oils and fats of a specific gravity of less than .970 which includes heating the same about the flash point under vacuum, to increase the specific gravity to about .975 and then ozonating same till about .5% ozone has been absorbed therein.

5. The process of treating oleaginous oils and fats of a specific gravity of less than .970 to remove the odoriferous components and increasing the specific gravity to about .970 to .980 by heating under diminished pressure and without the access of air and then ozonating.

6. In the process of producing a medicinal oil of the class including oleaginous oils and fats having a high ozone absorption factor, the step which includes heating the oil without the access of air, to increase the specific gravity to about .975 and a viscosity in excess of 130 Saybolt whereby the ozone absorption factor is increased and upwardly of .5% to 15% assimilable ozone will be absorbed without the use of a catalyst.

7. In the process of producing an oil of the class including oleaginous oils and fats having a high ozone absorption factor, the step or steps which includes heating the oil at an elevated temperature without access of air at diminished pressures for a protracted period of time of the order of about 560 degrees $F_\cdot$, 10 to 15 millimeters of pressure for one-half to two hours respectively, until the oil has reached a specific gravity of about .975, whereby the ozone absorption factor is increased and the assimilable ozone will be absorbed without the use of a catalyst.

8. The process of treating an oil of the class including linseed oil which includes preliminarily thickening the oil, heating the oil at an elevated temperature without access of air at diminished pressures for a protracted period of time, of the order of about 560 degrees F., 10 to 15 millimeters of pressure for one-half to two hours until the oil has reached a specific gravity of .975, then cooling the oil materially and passing ozone therethrough.

9. In the process of producing an oil of the class which includes oleaginous oils and fats having a high ozone absorption factor, the combination of step or steps which includes heating the oil at an elevated temperature without access of air at diminished pressures for a protracted period of time of the order of about 560 degrees F., 10 to 15 millimeters of pressure for one-half to two hours respectively, and passing a gaseous agent comprising ozone through the oil at temperature of the order of about 150 degrees F.

JAMES McKEE.